United States Patent
Lee et al.

(10) Patent No.: US 7,397,913 B2
(45) Date of Patent: Jul. 8, 2008

(54) TELEPHONE APPARATUS FOR STABILIZING CALL IN NO POWER OPERATION MODE AND METHOD FOR CONTROLLING THE SAME

(75) Inventors: Hea-Jeung Lee, Seoul (KR); Gye-Baeg Lee, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 970 days.

(21) Appl. No.: 10/267,877

(22) Filed: Oct. 10, 2002

(65) Prior Publication Data
US 2003/0072435 A1   Apr. 17, 2003

(30) Foreign Application Priority Data
Oct. 13, 2001   (KR) ............................... 2001-63238

(51) Int. Cl.
*H04M 1/00*   (2006.01)
(52) U.S. Cl. ........................... 379/395.01; 379/395.01
(58) Field of Classification Search ............ 379/387.01, 379/395.01; 323/231
See application file for complete search history.

(56) References Cited

U.S. PATENT DOCUMENTS 4,916,735 A * 4/1990 Iida et al. ..................... 379/413
5,014,308 A * 5/1991 Fox ............................. 379/413
6,647,117 B1 * 11/2003 Wallace et al. ............... 379/413

OTHER PUBLICATIONS

European Search Report; Application No. 02 02 2966; dated Feb. 14, 2005.

* cited by examiner

*Primary Examiner*—Sinh Tran
*Assistant Examiner*—Walter F Briney, III
(74) *Attorney, Agent, or Firm*—Robert E. Bushnell, Esq.

(57) ABSTRACT

A telephone apparatus and method for stabilizing a call in a no power operation (NPO) mode. A sub-controller controls the NPO mode by at least one of a central office line voltage and an external supply voltage, and a main controller performs a booting operation in response to the external supply voltage to control an operation of the sub-controller under the condition that the external supply voltage is provided. A power-on detector detects a power-on state to output a power-on detection signal to the sub-controller, whereupon, during a call connection in the NPO mode, the sub-controller outputs a booting hold or reset signal to the main controller to prevent the main controller from booting a program masked in an internal ROM area. A hook-on signal based on a hook-on state of a handset, causes the sub-controller to block the output of the hold or reset signal, enabling the main controller to perform the booting operation after a call termination occurs.

8 Claims, 4 Drawing Sheets

TELEPHONE APPARATUS FOR STABILIZING CALL IN NO POWER OPERATION MODE AND METHOD FOR CONTROLLING THE SAME

CLAIM OF PRIORITY

This application makes reference to, incorporates the same herein, and claims all benefits accruing under 35 U.S.C § 119 from an application entitled TELEPHONE APPARATUS FOR STABILIZING CALL IN NO POWER OPERATION MODE AND METHOD FOR CONTROLLING THE SAME earlier filed in the Korean Industrial Property Office on 31 Oct. 2001, and there duly assigned Serial No. 2001-63238 by that Office.

BACKGROUND OF THE INVENTION

1. Field of the Invention

The present invention relates to a telephone apparatus, and more particularly to a telephone apparatus which includes at least two processors and provides supplementary services as well as a voice communication service through a public telephone network or the Internet, and a method for controlling the same.

2. Description of the Related Art

Generally, a telephone apparatus has been used as basic equipment for conducting a telephone conversation by transmitting and receiving voice signals to/from another party through a public telephone network or the Internet. A noticeable progress of technologies associated with the Internet has allowed the telephone apparatus to send and receive E-mails and short message service (SMS) messages. In order to send and receive the E-mails and SMS messages in a wired telephone terminal, the telephone apparatus needs to use at least two processors. This is because it is necessary to efficiently control the generation of uniform resource locators (URLs), mail accounts and SMS messages, the operation of a modem, etc., in a distributed manner, as well as a voice communication function.

A representative example of such a composite telephone apparatus is shown in Korean Patent Application No. 2001-61064 filed on Sep. 29, 2001 by this applicant and entitled SYSTEM AND METHOD FOR PROVIDING TELEPHONE NUMBER-BASED E-MAIL SERVICE AND TELEPHONE USING THE SAME. In this application, there is provided a system comprising a sub-controller (described as an "SMS processor" in this application) for performing various control operations required for voice communication, and a main controller for mainly controlling the entire operation of a multifunctional telephone, including an operation of controlling the sending of E-mails and SMS messages. The sub-controller controls a basic operation of the telephone to generate a dual tone multi-frequency (DTMF) signal, and a specific operation to generate SMS messages. The main controller controls the generation of the E-mails and SMS messages, and the operation of a modem.

Such a multifunctional telephone apparatus having two processors as mentioned above, that is, a main controller and sub-controller, is constructed to operate various circuits by an external supply voltage. For example, the telephone apparatus is constructed to operate the respective circuits with a DC voltage of a predetermined level outputted from a DC adapter. This composite telephone apparatus, which operates its internal respective circuits with the external supply voltage, is adapted to maintain a basic telephone function of a handset as it is by a −48V speech loop voltage supplied over a telephone line when the external supply voltage is not inputted due to a power failure, etc. This is typically called a no power operation (NPO) function.

The operation of the telephone apparatus can be performed in such an NPO mode by full-wave rectifying the loop voltage and supplying the resulting voltage to the sub-controller (typically, a 4-bit microcomputer) which controls the basic telephone function.

In the telephone apparatus, however, when the external supply voltage is again supplied owing to the power failure recovery during a call connection in the NPO mode, the main controller, which includes a higher-level processor than that of the sub-controller, boots a program masked in a read only memory (ROM) area in response to a power-on reset signal to initialize the sub-controller and peripheral circuits controlled thereby. As a result, the telephone apparatus has a disadvantage in that the call connection in the NPO mode is not maintained and the apparatus is not operated until the booting by the main controller is completed. Namely, if the external supply voltage is again supplied owing to the power failure recovery in the NPO mode, the call connection state is not maintained, thereby causing great inconvenience to a user.

SUMMARY OF THE INVENTION

Therefore, the present invention has been made in view of the above problems, and it is an object of the present invention to provide a telephone apparatus which includes at least one processor, supports an NPO mode and maintains a call connection state even when the supply of power is restored in the NPO mode, and a method for controlling the same.

It is another object of the present invention to provide a multifunctional telephone apparatus which includes at least one processor, controls loads in a distributed manner, maintains a call connection even when the supply of power is restored in the NPO mode, and, after the call connection is completed, automatically boots to perform an initialization operation, and a method of controlling the same.

In accordance with one aspect of the present invention, the above and other objects can be accomplished by the provision of a telephone apparatus for stabilizing a call in a no power operation (NPO) mode, comprising: a power-on detector for detecting a power-on state of an external supply voltage to generate a power-on detection signal; a telephone circuit connected to a telephone line and having a sub-controller, the telephone circuit being operated in response to at least one of a loop voltage on the telephone line and the external supply voltage, and generating signals corresponding to key signals inputted from a keypad to control its internal telephone connector and audio circuit so as to form a voice speech loop; a main controller having an operation control port, the main controller being operated by booting an internal system program with the external supply voltage, and generating modulation/demodulation control signals and a control signal for the telephone circuit in response to a specific control signal; and a modem connected between the main controller and the telephone connector in the telephone circuit for modulating/demodulating input/output signals in response to the modulation/demodulation control signals; the sub-controller in the telephone circuit outputting a reset signal or hold signal to the operation control port of the main controller in response to the power-on detection signal to prevent the main controller from performing the booting operation.

Preferably, the sub-controller in the telephone circuit may block the output of the reset signal or hold signal to the main controller in response to a call termination signal based on a hook-on state of a handset.

In accordance with another aspect of the present invention, there is provided a method for stabilizing a call in a no power operation (NPO) mode of a telephone apparatus, the telephone apparatus including a sub-controller for controlling the NPO mode by at least one of a central office line voltage and an external supply voltage, and a main controller for performing a booting operation in response to the external supply voltage to control an operation of the sub-controller under the condition that the external supply voltage is provided, the method comprising the steps of: a) detecting a power-on state to generate a power-on detection signal; and b) outputting a reset signal or hold signal to an operation control port of the main controller in response to the power-on detection signal to prevent the main controller from booting a masked program.

Preferably, the method may further comprise the step of c) blocking the output of the reset signal or hold signal when the external supply voltage is provided during a call connection in the NPO mode, such that the main controller automatically boots the masked program in response to a call termination signal.

Therefore, even though the external supply voltage is provided during a call connection in the NPO mode, the main controller can be prevented from being operated, so the call connection can be maintained as it is.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

Figure 1:
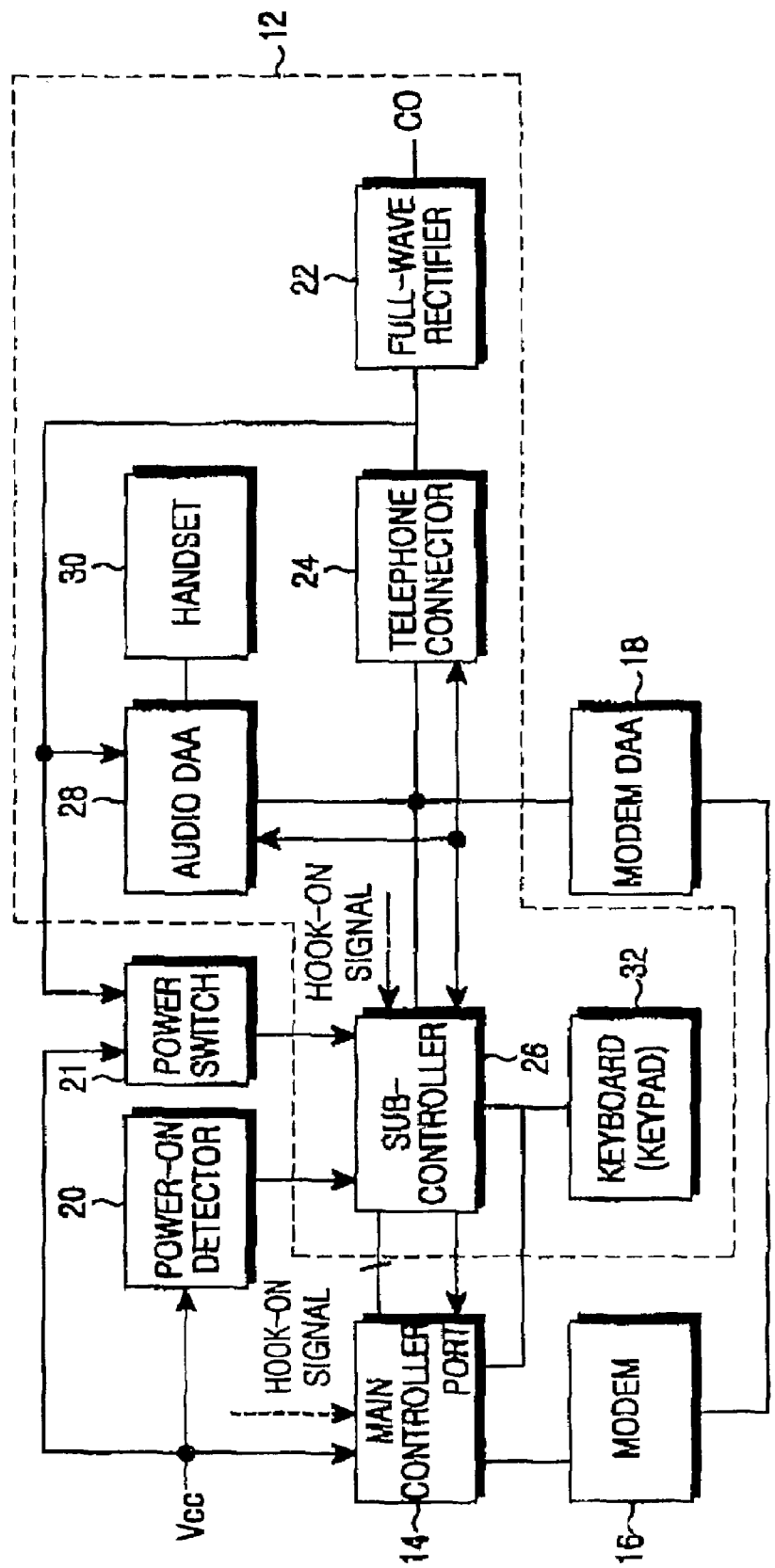
FIG. 1 is a block diagram showing the construction of a multifunctional telephone apparatus in accordance with the present invention.

FIG. 1 is a block diagram showing the construction of a multifunctional telephone apparatus in accordance with the present invention. A telephone circuit 12 of the multifunctional telephone apparatus is connected to a central office telephone line CO for performing a basic telephone operation including forming/blocking a central office telephone line loop in response to a hook "off/on" operation of a user.

A main controller (central processing unit) 14 generates a watchdog pulse and control signal for control of the telephone circuit 12 in response to an external supply voltage and an inactive state of a booting prevention signal, and generates a control signal in response to a data communication command, respectively.

A modem 16 connected to an output terminal of the main controller 14. The modem 16 is also connected to the telephone circuit 12 through a modem discrete analog access (DAA) unit 18 to perform data communication over the central office telephone line under the control of the main controller 14.

The modem DAA unit 18 is a modem interface which is connected between the modem 16 and the central office telephone line loop in the telephone circuit 12 to provide an interface between the modem 16 and the telephone line.

A power-on detector 20 detects a power-on state of the external supply voltage Vcc and generates a power-on detection signal.

A power switch 21 is further provided to receive the external supply voltage Vcc and a central office telephone line loop voltage, outputted from the telephone circuit 12 in a hook-off state, and selectively output at least one of the received voltages as an operating voltage to the telephone circuit 12.

A full-wave rectifier 22 is connected to the central office telephone line CO, polarity-aligns and full-wave rectifies the loop voltage (−48V/DC) from the central office telephone line CO and supplies the resulting voltage to the power switch 21 and a telephone connector 24.

The telephone connector 24 functions to form/block the central office telephone line loop in response to the hook off/on operation as in a general telephone.

A sub-controller (sub-microcomputer) 26 and audio DAA unit 28 are connected to the telephone connector 24, which is in turn connected to the modem 16 through the modem DAA unit 18.

The sub-controller 26 is connected between the main controller 14 and the telephone connector 24 to perform SMS message communication under the control of the main controller 14. The sub-controller 26 also functions to control the generation of a DTMF signal in an NPO mode and the operation of the telephone connector 24. The sub-controller 26 may be implemented with, for example, TCC120 which is a chip commercially available from Telechips Corporation in Korea.

The audio DAA unit 28 is connected to the telephone connector 24, the sub-controller 26 and a handset 30. The handset 30 is a voice input/output device having a speaker and microphone. The audio DAA unit 28 is an audio interface for performing a voice signal transmission/reception process required for a call connection over the telephone line. A keyboard 32 is a character input unit including keys for inputting numbers and characters. The keyboard 32 provides key inputs based on key operations by the user to the main controller 14 and sub-controller 26. Notably, in the case that the watchdog pulse from the main controller 14 is fixed at a specific level, the sub-controller 26 sets the operation mode of the telephone apparatus to the NPO mode and then performs the NPO mode operation independently.

Figure 2:
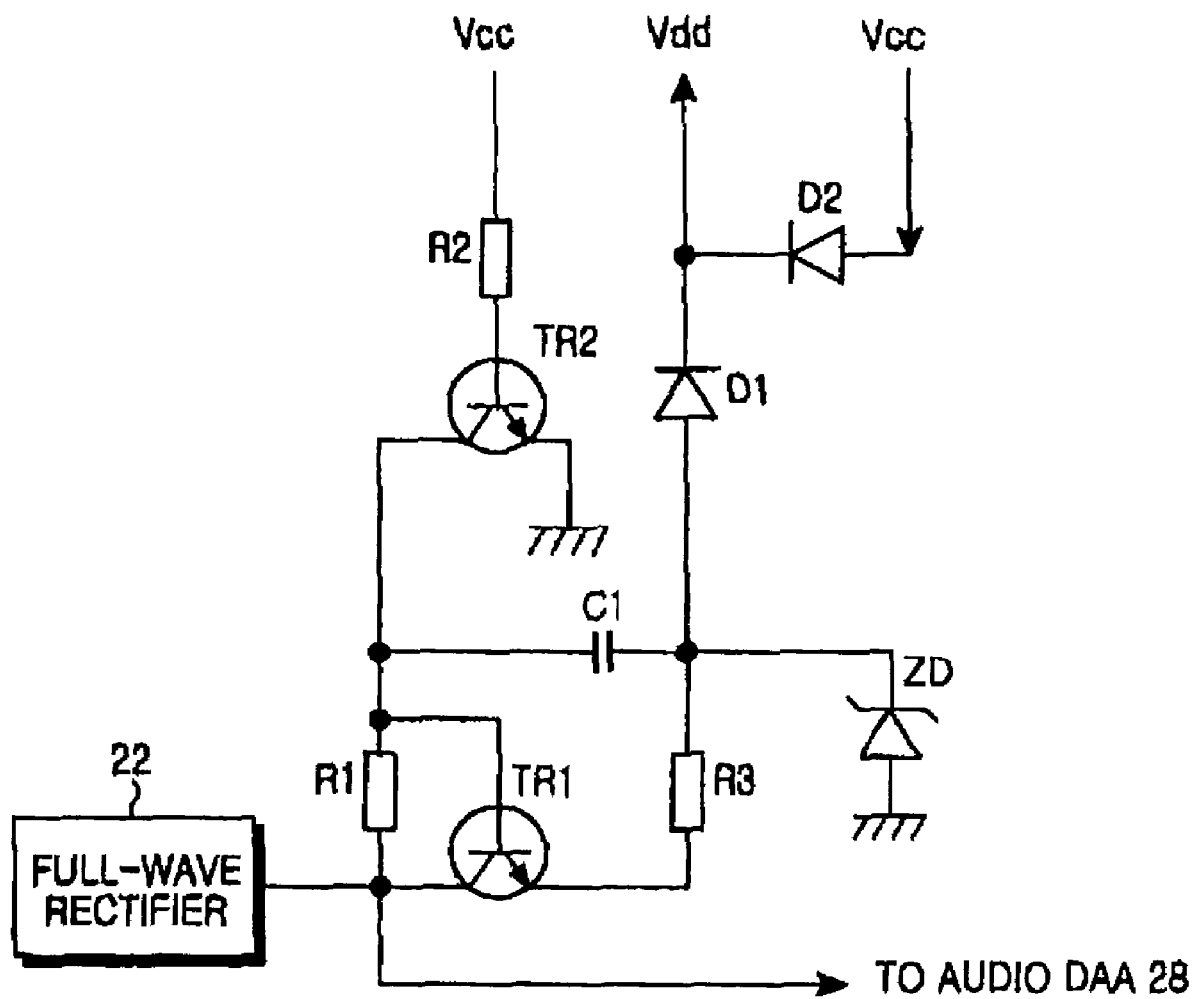
FIG. 2 is a circuit diagram showing a preferred embodiment of a power switch in FIG. 1.

FIG. 2 is a circuit diagram showing a preferred embodiment of the power switch 21 in FIG. 1. The power switch 21 includes a power switching transistor TR1 having its collector connected to the output of the full-wave rectifier 22 in the telephone circuit 12, and a resistor R1 having its one side connected to the output of the full-wave rectifier 22 and its other side connected in common to a collector of a transistor TR2 and a base of the transistor TR1.

The transistor TR2 receives the external voltage Vcc from the external power supply at its base via a resistor R2. The emitter of transistor TR2 is connected to a ground terminal The transistor TR1 also has its emitter connected to a power terminal Vdd of the sub-controller 26 via a resistor R3 and a diode D1 connected in series thereto. A Zener diode (reference diode) ZD with a Zener voltage of a predetermined level is connected between a connection node of the diode D1 and resistor R3 and a ground terminal.

A noise removal capacitor C1 is connected between the base of the transistor TR1 and a cathode of the Zener diode ZD. The diode D1 has its cathode connected to a cathode of a diode D2 whose anode receives the external supply voltage Vcc. The diodes D1 and D2 are used for reverse voltage prevention.

With the construction as shown in FIG. 2, the power switch 21 selects one of a loop voltage, full-wave rectified by the full-wave rectifier 22 (into 48V/DC) and then stabilized to a predetermined level by the Zener diode ZD, and the external supply voltage Vcc, and supplies the selected voltage as an operating voltage to the sub-controller 26.

For example, when the external voltage Vcc from the external power supply is not supplied due to a power failure, etc., the transistor TR2 is turned off and the diode D2 becomes nonconductive. Thus, if the telephone apparatus enters a hook-off state under the condition that the external voltage Vcc from the external power supply is not supplied due to a power failure, etc., the 48V loop voltage (central office line voltage) full-wave rectified by the full-wave rectifier 22 is stabilized to a predetermined level (about 3V/5V/9V) by the transistor TR1 and Zener diode ZD and is then supplied as the operating voltage to the power terminal Vdd of sub-controller 26 through the diode D1.

At this time, the sub-controller 26 is operated with the operating voltage. This operation mode is called the no power operation (NPO) mode. If the external supply voltage Vcc is restored and supplied in the NPO mode, the transistor TR2 is turned on and the transistor TR1 is thus turned off. As a result, the voltage from the full-wave rectifier 22 to the diode D1 is blocked and the external voltage Vcc is supplied as the operating voltage to the sub-controller 26 via the diode D2.

Accordingly, it will be understood that the sub-controller 26 in the telephone circuit 12 is operated with at least one of the external supply voltage and the loop voltage. The power switch 21 according to the preferred embodiment of FIG. 2 assigns a higher priority to the external supply voltage Vcc in such a manner that the external voltage Vcc is selected and outputted in preference to the loop voltage.

Figure 3:
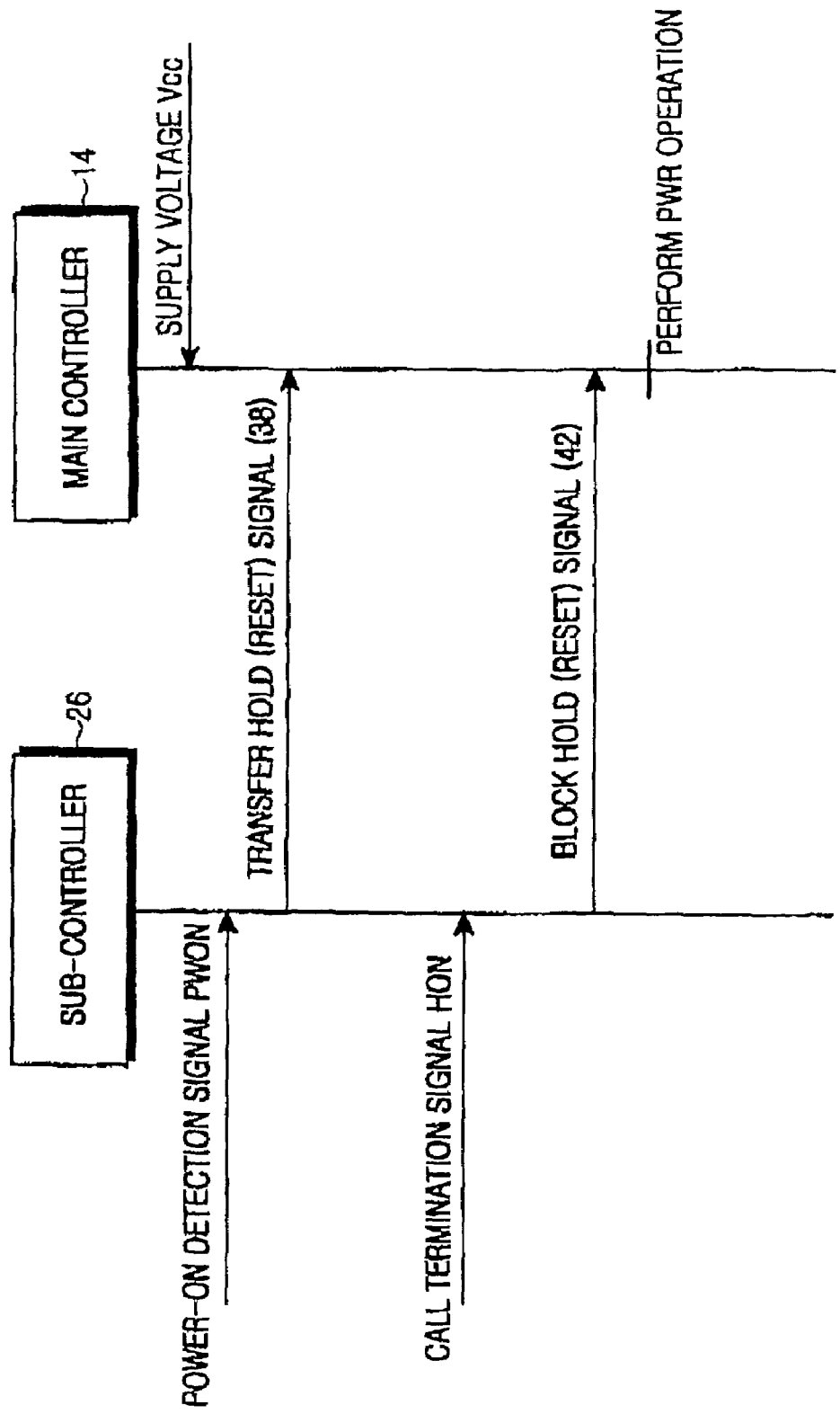
FIG. 3 is a flow chart illustrating a control operation of the multifunctional telephone apparatus in accordance with the present invention.
Figure 4:
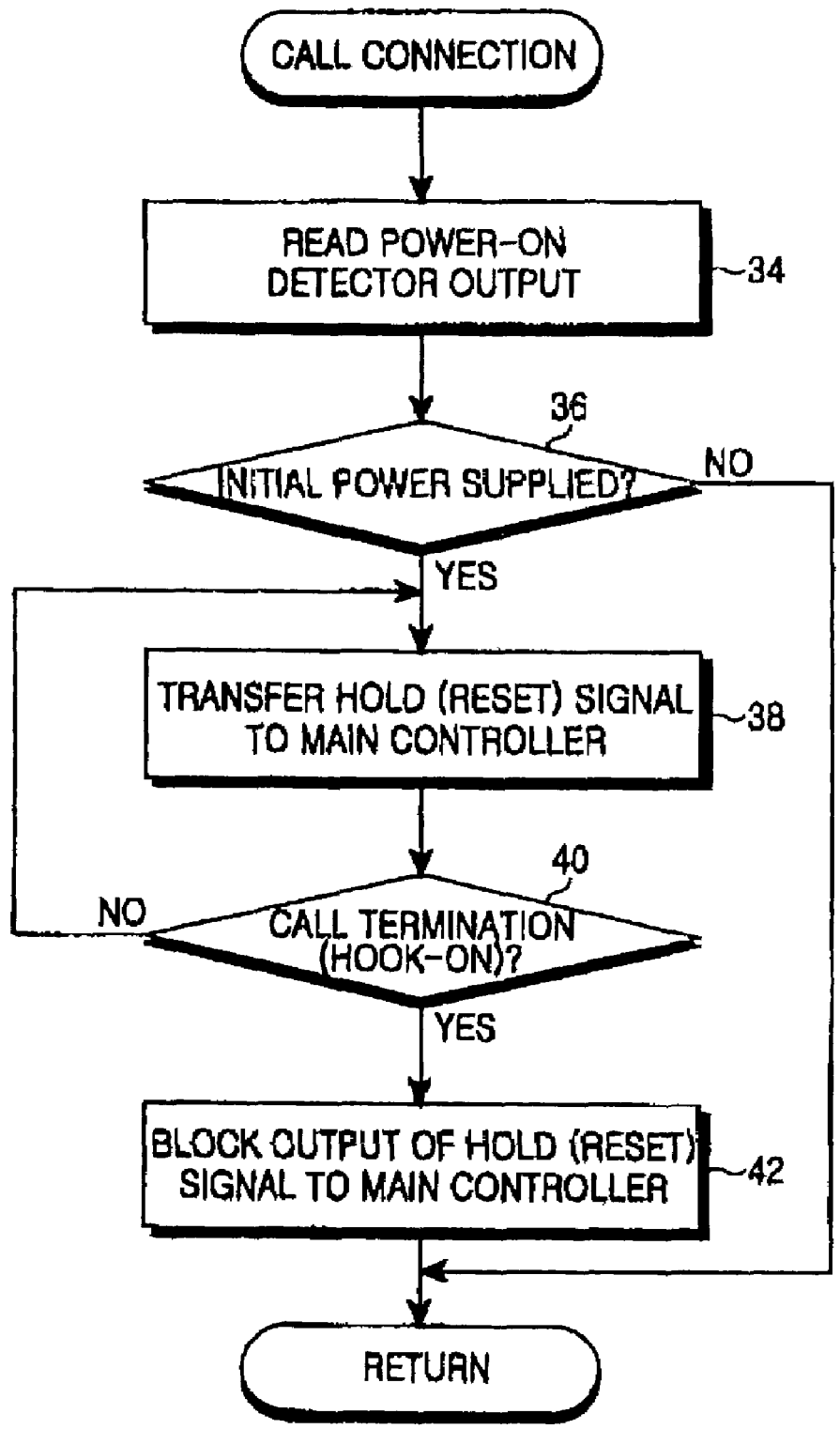
FIG. 4 is a flow chart illustrating a control operation of a preferred embodiment of a sub-controller in FIG. 2.

FIG. 3 is a flow chart illustrating a control operation of the multifunctional telephone apparatus in accordance with the present invention, and FIG. 4 is a flow chart illustrating a control operation of a preferred embodiment of the sub-controller in FIG. 2. A control program for execution of these control operations is masked in a ROM area of the sub-controller 26.

Now, an operation of stabilizing a call in the NPO mode in accordance with the present invention will be described in detail with reference to the flow charts of FIGS. 3 and 4. Here, it is assumed that the level of the external supply voltage Vcc to the main controller 14 in FIG. 1 is 0V and the call is established in the NPO mode where the loop voltage is supplied to the sub-controller 26.

While a call connection is made in the NPO mode, the sub-controller 26 reads the output of the power-on detector 20 at regular time intervals at step 34 of FIG. 4 to determine at step 36 whether the power-on detection signal PWON has been inputted. Upon determining at step 36 that the power-on detection signal PWON has not been inputted, the sub-controller 26 continuously maintains the call connection in the NPO mode. At this time, if the power failure is recovered and the external voltage Vcc is again supplied as shown in FIG. 3, the power-on detector 20 generates the power-on detection signal PWON in the form of a pulse with a predetermined period and supplies it to the sub-controller 26 as shown in FIG. 3. The power switch 21 switches the operating voltage to the sub-controller 26 from the loop voltage to the external supply voltage Vcc as stated previously with reference to FIG. 2.

Upon determining at step 36 that the power-on detection signal PWON has been inputted through the above procedure, the sub-controller 26 supplies a hold signal to an operation control port PORT of the main controller 14 in response to the power-on detection signal PWON at step 38 of FIGS. 3 and 4 to hold the operation of the main controller 14. The operation control port of the main controller 14 is pre-programmed or set in a hardware way to stop, for example, the booting operation when the hold signal inputted thereto remains active, for example, logic "high".

Provided that the control port does not have such a hold function, it may be replaced with a reset terminal. In this case, the output signal from the sub-controller 26 is transferred as a reset signal to the reset terminal.

As described above, in response to the hold signal or reset signal from the sub-controller 26, the main controller 14 remains in the hold or reset state continuously, even though the external voltage Vcc is inputted. Thus, the main controller does not perform the booting operation, etc., thereby enabling the call connection state in the NPO mode to be maintained as it is.

Meanwhile, after transferring the hold/reset signal to the operation control port PORT of the main controller 14 at step 38 of FIGS. 3 and 4, the sub-controller 26 determines at step 40 whether a hook-on signal HON (call termination signal) has been inputted thereto. This call termination signal is made active when the user puts down the handset to establish a hook-on state after completing a telephone conversation with another party, and is also provided to the main controller 14.

When the call termination signal is detected at the above step 40, the sub-controller 26 blocks the output of the hold or reset signal to the main controller 14 at step 42 of FIGS. 3 and 4. If the output of the hold or reset signal from the sub-controller 26 is blocked at step 42, the main controller 14 performs a power-on reset (PWR) operation in response to the external supply voltage Vcc and the hook-on signal to boot the program stored in the internal ROM area and initialize the multifunctional telephone apparatus of FIG. 1.

At this time the main controller 14 then provides a pulse stream, including the watchdog pulse, with a predetermined period to the sub controller 26 to release the NPO mode, and the sub-controller 26 controls the telephone circuit in response to the watchdog pulse of the pulse stream under the control of the main controller 14.

As apparent from the above description, the present invention provides a multifunctional telephone apparatus which is capable of performing a call connection in an NPO mode by a sub-controller when an external voltage Vcc is not supplied, and automatically holding a booting operation of a main controller until a call termination when the external voltage Vcc is restored during the call connection in the NPO mode, thereby preventing a call from being cut off due to the booting operation during the call connection.

As described above, the multifunctional telephone apparatus supports the call connection in the NPO mode and eliminates the call cutoff resulting from the booting operation of the main controller following the restoration of the external supply voltage. Therefore, the present invention has the effect of enhancing convenience of use of a multifunctional telephone apparatus having two or more processors.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A telephone apparatus which has at least two processors and stabilizes a call in a no power operation (NPO) mode, said telephone apparatus comprising:
    a power-on detector for detecting a power-on state of an external supply voltage to generate a power-on detection signal when said telephone apparatus is operating in said no power operation mode;
    a power switch receiving a central office telephone line loop voltage outputted from a telephone circuit in a hook-off state and the external supply voltage, said power switch selectively outputting at least one of the received voltages as an operating voltage to the telephone circuit;
    said telephone circuit being connected to a central office telephone line, said telephone circuit being operated in response to said loop voltage on said telephone line during said no power operation mode and being operated in response to said external supply voltage when said external supply voltage is received by said power switch;
    a main controller having an operation control port, said main controller performing a power-on reset operation to boot an internal system program when said external supply voltage is received by said main controller during said no power operation mode; and
    a sub-controller included in said telephone circuit, said sub-controller outputting a booting prevention signal to said operation control port of said main controller in response to said power-on detection signal to prevent said main controller from performing the power-on reset operation;
    said telephone circuit having a full-wave rectifier for rectifying said loop voltage;
    said power switch having voltage stabilization means for stabilizing to a predetermined level said loop voltage rectified by said full-wave rectifier and outputting the stabilized voltage to a power terminal of said sub-controller, and switching means connected to said voltage stabilization means, said switching means being operated in response to said external supply voltage to block the output of said stabilized voltage and providing said external supply voltage to said power terminal of said sub-controller;
    said voltage stabilization means comprising:
        a first resistor having first and second ends, said first end being connected to an output terminal of said full-wave rectifier;
        a first transistor having a base terminal connected to said second end of said first resistor, and an collector connected to said first end of said first resistor;
        a capacitor connected between said first end of said first resistor and a node;
        a second resistor connected between said node and an emitter of said first transistor; and
        a Zener diode connected between a ground terminal and said node;
    said switching means comprising:
        a second transistor having a base connected to receive said external supply voltage via a third resistor, a collector connected to said base of said first transistor and an emitter connected to the ground terminal;
        a first diode having an anode connected to said node and a cathode connected said power terminal of said sub-controller and said node; and
        a second diode having an anode connected to receive said external supply voltage and a cathode connected to the cathode of said first diode.

2. The telephone apparatus as set forth in claim 1, wherein said sub-controller is adapted to block the output of said booting prevention signal to said operation control port of said main controller in response to a call termination signal based on a hook-on state of a handset.

3. The telephone apparatus as set forth in claim 2, wherein said booting prevention signal is a hold signal for holding the operation of said main controller.

4. The telephone apparatus as set forth in claim 2, wherein said booting prevention signal is a reset signal for resetting said main controller, and wherein said operation control port is a reset terminal of said main controller.

5. The telephone apparatus as set forth in claim 2, wherein said internal system program is stored in an internal read only memory (ROM) area of said main controller and said main controller is adapted to access and boot said internal system program upon receiving a hook-on signal after the output of said booting prevention signal from said sub-controller is blocked.

6. The telephone apparatus as set forth in claim 1, wherein said booting prevention signal is a hold signal for holding the operation of said main controller.

7. The telephone apparatus as set forth in claim 1, wherein said booting prevention signal is a reset signal for resetting said main controller, and wherein said operation control port is a reset terminal of said main controller.

8. The telephone apparatus as set forth in claim 1, wherein said telephone circuit further includes:
    a telephone connector being connected to said full-wave rectifier to form a telephone line loop;
    an audio circuit being connected to said telephone connector to transmit and receive voice signals; and
    said sub-controller generating dual tone multi-frequency (DTMF) signals corresponding to key signals inputted from a keypad in said no power operation mode to control said audio circuit and said telephone connector.

* * * * *